United States Patent
Park

(10) Patent No.: US 7,252,425 B2
(45) Date of Patent: Aug. 7, 2007

(54) LIGHT GUIDE PANEL USABLE WITH BACKLIGHT UNIT, BACKLIGHT UNIT EMPLOYING THE SAME, AND MANUFACTURING METHOD THEREOF

(75) Inventor: Joon-chan Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/159,106

(22) Filed: Jun. 23, 2005

(65) Prior Publication Data
US 2005/0286266 A1     Dec. 29, 2005

(30) Foreign Application Priority Data
Jun. 23, 2004    (KR) ................. 10-2004-0046956

(51) Int. Cl.
*F21V 7/04* (2006.01)

(52) U.S. Cl. ............... 362/616; 362/627; 362/629; 349/65; 385/901

(58) Field of Classification Search ......... 362/613, 362/616, 627–629; 349/65; 385/901
See application file for complete search history.

(56) References Cited

U.S. PATENT DOCUMENTS

| | | | |
|---|---|---|---|
| 5,161,873 A | * | 11/1992 | Obata ................. 362/613 |
| 5,764,322 A | * | 6/1998 | Mamiya et al. .......... 362/616 |
| 2003/0169384 A1 | | 9/2003 | Ohkawa |
| 2003/0227768 A1 | | 12/2003 | Hara et al. |

FOREIGN PATENT DOCUMENTS

| | | |
|---|---|---|
| JP | 05-158036 | 6/1993 |
| JP | 7-23302 | 4/1995 |
| JP | 09-211451 | 8/1997 |

OTHER PUBLICATIONS

Korean Office Action dated May 30, 2006 issued in KR 2004-46956.

* cited by examiner

*Primary Examiner*—Stephen Husar
(74) *Attorney, Agent, or Firm*—Stanzione & Kim, LLP

(57) ABSTRACT

A light guide panel usable with a backlight unit is capable of enhancing brightness uniformity and reducing light loss. The light guide panel includes a transparent plate one side of which is a plane of incidence. An interior of the light guide panel is divided by a plurality of planes inclined with respect to the plane of incidence, and each of the respective inclined planes is partial-reflection-coated.

12 Claims, 3 Drawing Sheets

LIGHT GUIDE PANEL USABLE WITH BACKLIGHT UNIT, BACKLIGHT UNIT EMPLOYING THE SAME, AND MANUFACTURING METHOD THEREOF

CROSS-REFERENCE TO RELATED APPLICATIONS

This application claims the priority under 35 U.S.C. §119 of Korean Patent Application No. 2004-46956, filed on Jun. 23, 2004, in the Korean Intellectual Property Office, the disclosure of which is incorporated herein in its entirety by reference.

BACKGROUND OF THE INVENTION

1. Field of the Invention

The present general inventive concept relates to a light guide panel usable with a backlight unit, a backlight unit employing the same, and a manufacturing method thereof, and more particularly, to a light guide panel usable with a backlight unit and a manufacturing method thereof, which can improve brightness uniformity, enhance light utilization by preventing light loss, reduce manufacturing costs, and simplify a manufacturing process.

2. Description of the Related Art

A backlight unit is disposed at a rear side of a liquid crystal display (LCD) panel and is used to convert a line light source into a uniform surface light source and to illuminate a liquid crystal display (LCD) panel. Initially, backlight units had several lamps arranged at a rear side of an LCD panel at constant intervals. Recently, an edge light type backlight unit has been widely used because it is advantageous to the slimness and the lifetime of the LCD.

FIG. 1 is an exploded side sectional view of a conventional backlight unit.

Referring to FIG. 1, a conventional backlight unit includes a lamp 10, a lamp reflector 11, a reflect panel 30, a light guide panel 20, a diffuse panel 40, a brightness enhancement film 50, and a polarization enhancement film 60.

The lamp 10 is a line light source for the backlight unit. The lamp reflector 11 reflects a light, which is radiated from the lamp 10 in a direction opposite to the light guide panel 20, so that the light can be propagated to the light guide panel 20. The light guide panel 20 receives the light of the one-dimensional line light source from the lamp 10 and the lamp reflector 11 through one side and converts the line light source into a surface light source. Light from the surface light source is propagated to the diffuse panel 40. The reflect panel 30 reflects light incident from the light guide panel 20, so that the light can be redirected to the light guide panel 20. The diffuse panel 40 scatters the light propagated from the light guide panel 20, such that the light is uniformly distributed. The brightness enhancement film 50 refracts and focuses the light propagated from the diffuse panel 40, such that straightness and brightness of the light is enhanced. The brightness enhancement film 60 enhances polarization efficiency of the light propagated from the brightness embodiment film 50 and thus improves light efficiency.

The light guide panel 20 is an essential part of the backlight unit. The conventional light guide panel 20 includes a light scatter layer, which is formed on a lower surface of a transparent acrylic resin plate. When line light source is irradiated to one side surface of the light guide panel 20, the irradiated light is totally reflected to the upper and lower surfaces of the light guide panel 20 and is vertically scattered by the light scatter layer, and then passes through the light guide panel 20.

Referring to FIG. 2, the light scatter layer is generally provided with dot light scatter patterns 21, which are arranged with different diameters, densities and pitches with respect to each other. In an example of FIG. 2, sizes of the dot light scatter patterns 21 increase depending on distance from the lamp 10. If the dot light scatter patterns 21 are formed with the same diameters, densities and pitches, positions near the lamp 10 are brighter than positions far from the lamp 10. Thus, brightness distribution of the light emitted from the light guide panel 20 becomes ununiform. In order to emit light with a uniform brightness distribution, the dot light scatter patterns 21 are formed with different diameters, densities and pitches, depending on their positions. A screen printing method is widely used to form the dot light scatter patterns 21.

As described above, when forming the light scatter layer of the light guide panel 20, the dot light scatter patterns 21 are modified so as to improve the brightness uniformity. That is, as the distance from the lamp 10 becomes greater, intensity of the light incident to the light guide panel 20 decreases. Also, the brightness of the light propagated along the light guide panel 20 and scattered at the dot light scatter patterns 21 is proportional to the areas of the dot light scatter patterns 21. Therefore, in order to obtain the uniform brightness distribution all over the light guide panel 20, the diameters of the dot light scatter patterns 21 are designed to increase according to a certain function as their distance from the line light source increases. Also, the pitches of the dot light scatter pattern 21 are designed to increase the uniformity by making the scattered light of the dot light scatter patterns 21 sufficiently overlap. The densities of the dot light scatter patterns 21 are also designed to increase uniformity. However, it is difficult to design the pattern arrangement with satisfactory brightness uniformity. It is usual that the satisfactory brightness uniformity may not be obtained even by several trials and errors.

Since the light is propagated through the total reflection until the light reaches the dot light scatter patterns 21, the light loss occurs as a moving path of the light becomes longer. Thus, only some of a total amount of the light emitted from the light source is propagated through the upper surface of the light guide panel 20, so that light utilization is degraded.

Further, when manufacturing the light guide panel 20, a process of printing the dot light scatter patterns 21 is not simple. One light guide panel includes thousands to tens of thousands of the dot light scatter patterns 21. The sizes of the dot light scatter patterns 21 range from tens of micrometers to thousands of micrometers. When forming small patterns, it is necessary to decrease viscosity of a print ink because the print ink is difficult to pass through a screen. In contrast, when forming large patterns, it is necessary to increase viscosity of the print ink because the print ink is easy to pass through the screen. Due to these conflicting requirement conditions, it is difficult to adjust the viscosity of the print ink. That is, when the viscosity is high, some of the dot patterns with small diameters may not be printed. When the viscosity is low, some of the dot patterns with large diameters may be spread out. Since it is difficult to properly adjust viscosity due to many dot patterns and their various sizes, process yield is degraded and therefore a manufacturing cost is increased.

SUMMARY OF THE INVENTION

The present general inventive concept provides a light guide panel usable with a backlight unit and a manufacturing method thereof, which can improve brightness uniformity, enhance light utilization by preventing light loss, reduce manufacturing costs, and simplify a manufacturing process.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a light guide panel usable with a backlight unit to convert a line light source into a surface light source. The light guide panel includes a transparent plate one side of which is a plane of incidence. An interior portion of the light guide panel is divided by a plurality of planes inclined with respect to the plane of incidence, and each of the respective inclined planes is partial-reflection-coated.

The foregoing and/or other aspects of the present general inventive concept are also achieved by providing a method of manufacturing a light guide panel usable with a backlight unit. The method includes partial-reflection-coating a plurality of transparent plates, making a transparent plate assembly by stacking and coupling the partial-reflected-coated transparent plates, and inclinedly cutting the transparent plate assembly to provide a plurality of light guide panels having a predetermined thickness.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
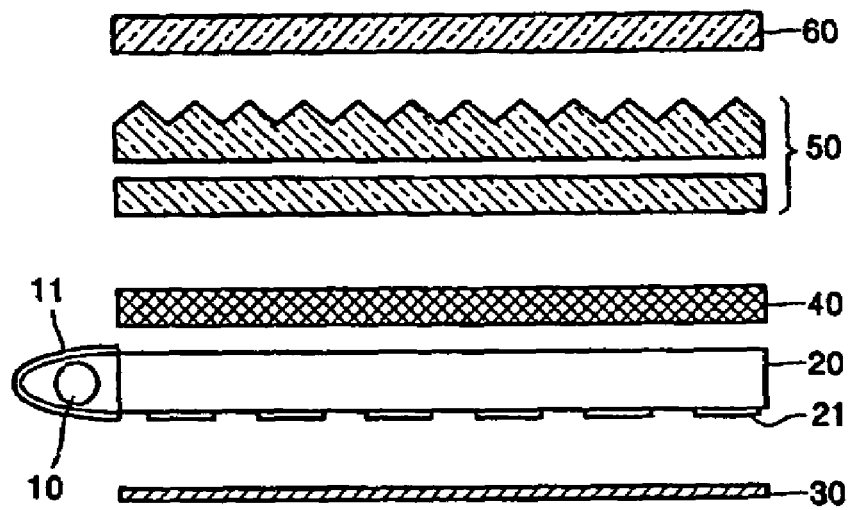
FIG. 1 is an exploded side sectional view of a conventional backlight unit.
Figure 2:
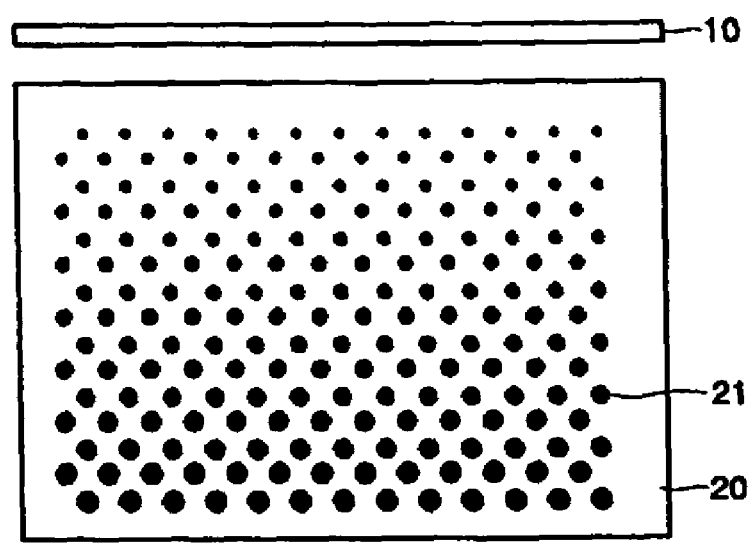
FIG. 2 is a view of dot patterns of a light guide panel of the conventional backlight unit of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
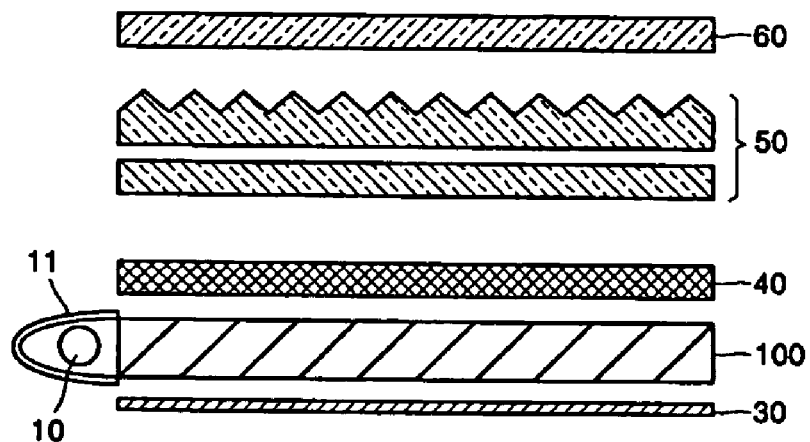
FIG. 3 is an exploded side sectional view illustrating a backlight unit having a light guide panel according to an embodiment of the present general inventive concept.
Figure 4:
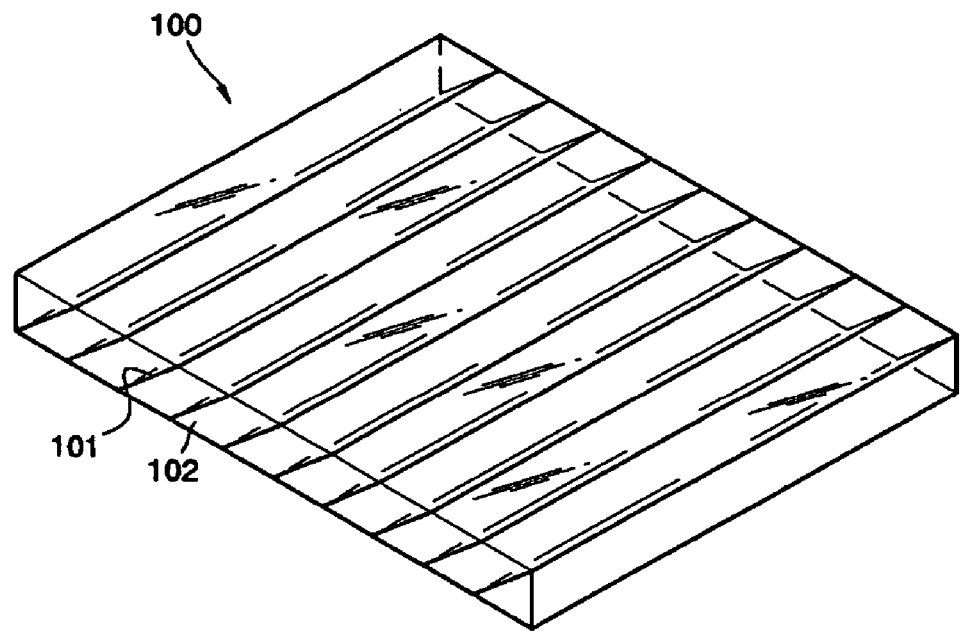
FIG. 4 is a perspective view illustrating the light guide panel of FIG. 3.

FIG. 3 is an exploded side sectional view illustrating a backlight unit having a light guide panel 100 according to an embodiment of the present general inventive concept, and FIG. 4 is a perspective view of the light guide panel 100 of FIG. 3.

Referring to FIGS. 3 and 4, the backlight unit includes a lamp 10, a lamp reflector 11, a reflect panel 30, the light guide panel 100, a diffuse panel 40, a brightness enhancement film 50, and a polarization enhancement film 60.

The lamp 10 is a line light source to irradiate light. The lamp reflector 11 reflects light, which is irradiated from the lamp 10 in a direction opposite to the light guide panel 100, so that the light reflected by the lamp reflector 11 is incident to the light guide panel 100. The light guide panel 100 receives the light of the line light source from the lamp 10 and the lamp reflector 11 through a side thereof and converts the line light source into a surface light source by propagating the received light over a surface of the light guide panel 100. The light propagating from the surface of the light guide panel 100 is incident to the diffuse panel 40. The reflect panel 30 reflects light propagated through the light guide panel 100 in a direction away from the diffuse panel 40 such that the light reflected by the reflect panel 30 can be redirected to the light guide panel 100 and propagated from the surface of the light guide panel 100 towards the diffuse panel 40. The diffuse panel 40 scatters the light propagated from the light guide panel 100, such that the light is uniformly distributed. The brightness enhancement film 50 refracts and focuses the light propagated from the diffuse panel 40, such that straightness and brightness of the light are enhanced. The brightness enhancement film 60 enhances polarization efficiency of the light and thus improves light efficiency.

The light guide panel 100 converts the line light source into a uniform surface light source. The light guide panel 100 includes a transparent plate having a first side which is a plane of incidence. That is, the light irradiated from the line light source enters the transparent plate through the first side. The transparent plate of the light guide panel 100 is divided by a plurality of planes 101 inclined with respect to the plane of incidence. Each of the inclined planes is partial-reflection-coated. The light guide panel 100 is provided with a plurality of transparent bars 102 attached to one another along the inclined planes 101. The light guide panel 100 may be formed of plastic, acryl, optical glass, and the like.

The partial reflection coating of the inclined planes 101 is a coating which partially reflects and transmits light reaching a coated surface of each of the inclined planes 101. For example, the partial reflection coating of the inclined planes 101 can be achieved by depositing a dielectric material, such as $MgF_2$, on the surface of each of the inclined planes 101. Reflectivity and transmittance with respect to the light incident to the inclined planes 101 can be adjusted by modifying a coating specification of the partial reflection coating.

Each of the inclined planes 101 can be partial-reflection-coated according to different coating specifications with respect to each other such that the reflectivity can increase in proportion to a distance of the inclined planes from the line light source. Also, the partial reflection coating of an inclined plane which is the farthest from the line light source has a reflectivity of 100% so as to prevent the light from transmitting through the inclined plane which is farthest from the line light source and leaking out of the light guide panel 100.

The inclined planes 101 can be inclined at 45° with respect to the plane of incidence such that the light emitted from the lamp 10 in parallel to the light guide panel 100 can be propagated from the light guide panel 100 towards the diffuse panel 40.

Figure 5:
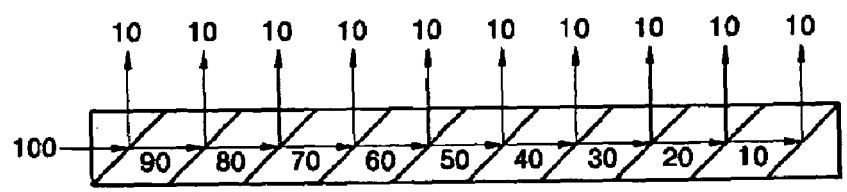
FIG. 5 is a view illustrating operations of the light guide panel of FIG. 3 according to an embodiment of the present general inventive concept.

FIG. 5 is a view illustrating operations of a light guide panel according to an embodiment of the present general inventive concept. Referring to FIG. 5, the light guide panel includes ten inclined planes. Numbers in FIG. 5 are not reference numerals, but amounts of reflected light and amounts of transmitted light at the inclined planes with respect to the total light amount. First, a light amount of 100 (total light amount) is incident to a plane of incidence, that is, a first side of the light guide panel. At a first inclined plane, a light amount of 10 is reflected toward an exit surface of the light guide panel and a light amount of 90 (total light amount less the light amount of 10 reflected by the first inclined plane) is transmitted and propagated to a second inclined plane. Then, at the second inclined plane, a light amount of 10 of the light amount of 90 is reflected toward the exit surface of the light guide panel and a light amount of 80 is transmitted and propagated to a third inclined plane. In this manner, the light amounts reflected from the respective inclined planes are equal and the light amounts transmitted gradually decrease. At a tenth inclined plane, a light amount of 10 is incident and reflected and no light is transmitted.

In order to obtain the results of the example illustrated in FIG. 5, the inclined planes must be coated according to a specification illustrated in Table 1 below.

TABLE 1

|  | 1 | 2 | 3 | 4 | 5 | 6 | 7 | 8 | 9 | 10 |
|---|---|---|---|---|---|---|---|---|---|---|
| Reflectivity | 10% | 11.1% | 12.5% | 14.3% | 16.7% | 20% | 25% | 33.3% | 50% | 100% |
| Transmittance | 90% | 88.9% | 87.5% | 85.7% | 83.3% | 80% | 75% | 66.7% | 50% | 0% |

In Table 1, numerals 1 through 10 represent the inclined planes in order of a nearest location to a farthest location with respect to a lamp. If the respective inclined planes are partial-reflection-coated according to the above specification, a uniform light amount can be achieved over the exit surface of the light guide panel. Even when the number of the inclined planes is changed, it is possible to determine a coating specification to achieve a uniform light amount over the exit surface of the light guide panel.

A light guide panel usable with in a backlight unit can be manufactured by various methods. For example, partial reflection coating can be performed on attachment surfaces of the transparent bars (102, in FIG. 4) formed in a proper shape and the transparent bars can then be attached to one another. However, this method may be undesirable because the operations are not simple.

Figure 6:
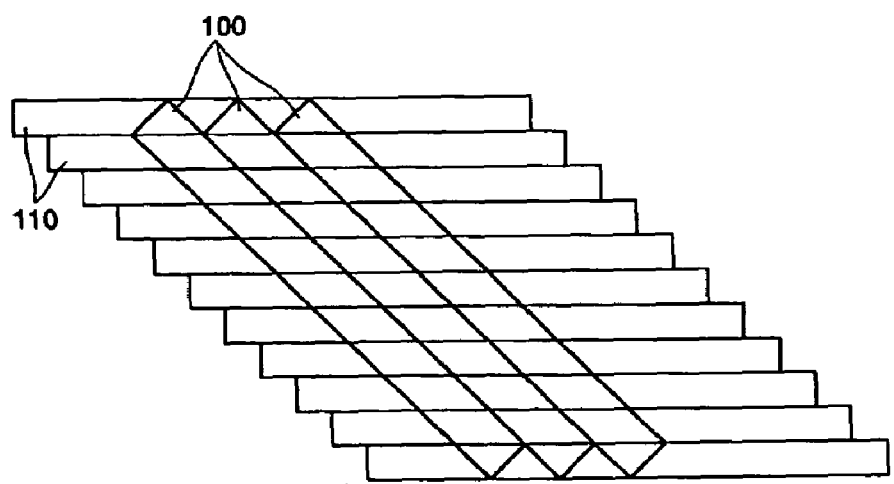
FIG. 6 is a view illustrating a method of manufacturing the light guide panel of FIG. 3 usable in the backlight unit according to an embodiment of the present general inventive concept.

FIG. 6 is a view illustrating a method of manufacturing a light guide panel usable with the backlight unit according to an embodiment of the present general inventive concept. Referring to FIG. 6, a plurality of partial-reflection-coated transparent plates 110 are stacked to form a transparent plate assembly. Each of the transparent plates 110 is partial-reflection-coated prior to the stacking thereof. A plurality of light guide panels 100 is provided by inclinedly cutting the transparent plate assembly.

In order to obtain the light guide panel 100 having good characteristics in light-amount uniformity or brightness uniformity, the partial reflection coating of the transparent plates 110 is performed by partial-reflection coating the transparent plates 110 according to different coating specifications with respect to each other so that the transparent plates 111 have increasing reflectivity. Also, the transparent plate assembly is made by stacking the transparent plates 110 in an order of the reflectivity of the partial reflection coating.

Further, the transparent plates 110 can be inclinedly stacked in one direction to prevent waste of materials.

The transparent plates 110 may be formed of plastic, acryl or glass.

A light guide panel usable with a backlight unit according to embodiments of the present general inventive concept can enhance brightness uniformity simply and accurately. Also, a moving path of light is short because light reflected from inclined planes is used. Therefore, light loss is prevented and light utilization is enhanced. Further, because formation of complex dot patterns is unnecessary, manufacturing costs are reduced and a manufacturing process is simplified.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A light guide panel usable with a backlight unit to convert a line light source into a surface light source, comprising:

a transparent plate one side of which includes a plane of incidence to receive the line light source; and a plurality of planes inclined with respect to the plane of incidence dividing an interior portion of the transparent plate, each of the respective inclined planes being partial-reflection-coated wherein the respective inclined planes are partial-reflection-coated according to different coating specifications with respect to each other to make reflectivity increase in proportion to distance from the line light source.

2. The light guide panel of claim 1, wherein the inclined planes are inclined at 45° with respect to the plane of incidence.

3. The light guide panel of claim 1, wherein the transparent plate is formed of one of plastic, acryl and glass.

4. A light guide panel usable with a backlight unit to convert a line light source into a surface light source, comprising:

a transparent plate one side of which includes a plane of incidence to receive the line litht source; and a plurality of planes inclined with respect to the plane of incidence dividing an interior portion of the transparent plate, each of the respective inclined planes being partial-reflection-coated wherein the partial reflection coating of the inclined plane farthest from the line light source has 100% reflectivity.

5. A light guide panel usable with a backlight unit, comprising:

a receiving surface to receive light therethrough; and a plurality of partial-reflection-coated inclined planes inclined with respect to the receiving surface to sequentially reflect an increasing percentage of the received light at a predetermined angle such the each sequential inclined plane receives a smaller percentage of the received light.

6. The light guide panel of claim 5, wherein the each of the plurality of partial-reflection-coated inclined planes reflect an equal amount of the received light.

7. A light guide panel usable with a backlight unit to convert a line light source to a surface light source, comprising:

a plurality of transparent plates sequentially disposed in parallel with each other along a light path of the line light source and partially reflection coated such that each plate reflects a predetermined amount of light incident thereon at a predetermined angle with respect to the light path and transmits a remaining amount of the light incident thereon along the light path towards a next sequential plate, wherein the respective plates are partial-reflection-coated according to different coating specifications with respect to each other to make reflectivity increase in proportion to distance from the line light source.

8. A method of manufacturing a light guide panel usable with a backlight unit, the method comprising:

partial-reflection-coating a plurality of transparent plates;

making a transparent plate assembly by stacking and coupling the partial-reflection-coated transparent plates; and inclinedly cutting the transparent plate assembly to provide a plurality of light guide panels having a predetermined thickness, wherein the partial-reflection-coating of the plurality of transparent plates comprises partial-reflection-coating the plurality of transparent plates according to different coating specifications with respect to each other to make the transparent plates have increasing reflectivity, and the making of the transparent plate assembly comprises stacking and coupling the transparent plates in an order of the reflectivity of the partial reflection coating.

9. The method of claim 8, wherein the making of the transparent plate assembly comprises stacking and coupling the transparent plates such that the transparent plates are inclined in the same direction with respect to each other.

10. The method of claim 8, wherein the transparent plate is formed of one of plastic, acryl and glass.

11. A method of converting a line light source into a surface light source, the method comprising:

receiving light through a first surface; and sequentially passing the received light through a plurality of inclined planes to reflect a predetermined amount of the received light through a second surface orthogonal to the first surface, wherein the sequentially passing of the received light through the plurality of inclined planes comprises:

sequentially receiving a decreasing amount of light at each inclined plane, and sequentially reflecting an increasing percentage of the decreasing amount of light toward the second surface at each inclined plane.

12. A backlight unit comprising:

a line light source to irradiate light; and a light guide panel to convert the line light source into a surface light source and comprising a transparent plate including a first side which is a plane of incidence, and a plurality of planes inclined with respect to the plane of incidence dividing an interior portion of the transparent plate, each of the respective inclined planes being partial-reflection-coated to reflect through a second side a predetermined equal percentage amount of the light received from the line light source, wherein the respective inclined planes are partial-reflection-coated according to different coating specifications with respect to each other to make reflectivity increase in proportion to distance from the line light source.

* * * * *